July 22, 1958  J. E. STAATS  2,844,702
BROILING OVEN
Filed Dec. 12, 1956

INVENTOR.
JAMES E. STAATS
BY
HIS ATTORNEY

United States Patent Office 2,844,702
Patented July 22, 1958

2,844,702

BROILING OVEN

James E. Staats, Louisville, Ky., assignor to General Electric Company, a corporation of New York Application December 12, 1956, Serial No. 627,820

1 Claim. (Cl. 219—35)

This invention relates to broiling ovens, and has as its principal object the provision of an oven of this type in which the concentration or intensity of the heat radiated from the broiling unit may be varied by means of a manually operable control.

Further objects and advantages of the invention will become apparent as the following description proceeds, and the features of novelty which characterize the invention will be pointed out with particularity in the claims annexed to and forming a part of this specification.

Briefly stated, in accordance with one aspect of this invention there is provided an oven including a multiple section heating unit, pivotally mounted reflectors associated with each heater section, and manually operable means for positioning the reflectors so as to concentrate the radiated heat in a desired pattern at a preselected distance.

For a better understanding of the invention, reference may be made to the following description and the accompanying drawing in which.

Figure 1:
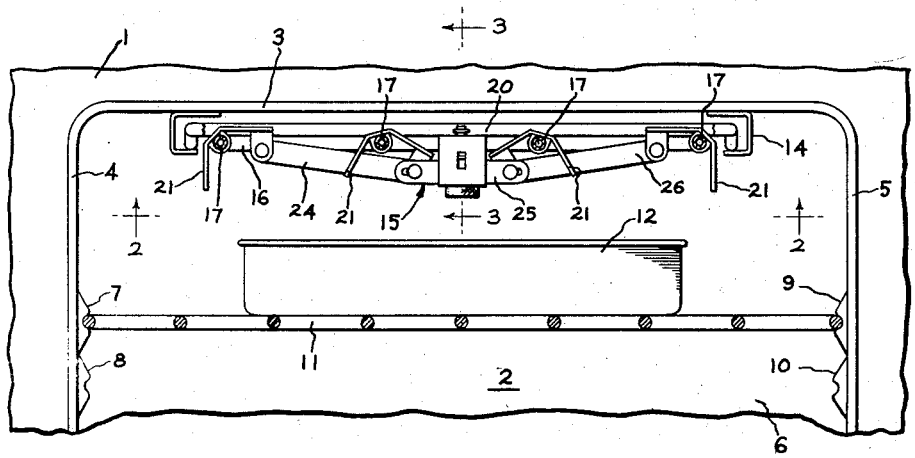
Fig. 1 is a fragmentary front elevation view of a broiling oven embodying the present invention.
Figure 2:
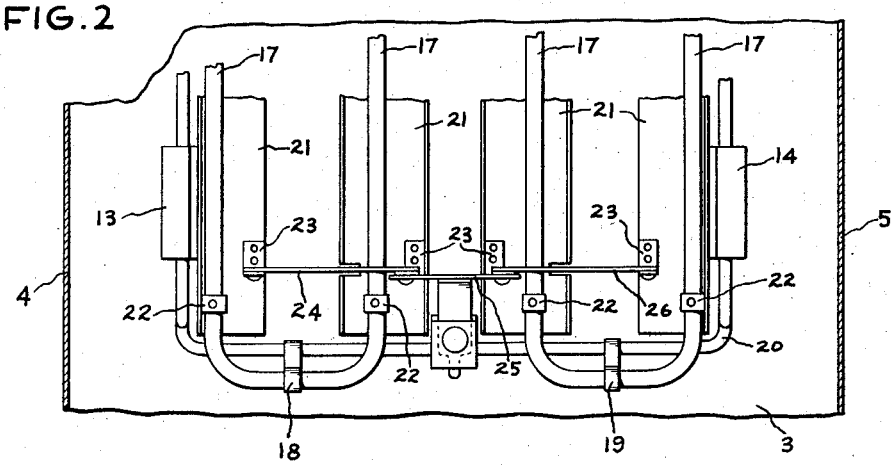
Fig. 2 is a fragmentary sectional view taken along the line 2—2 in Fig. 1.

Referring to the drawing, the reference numeral 1 designates the front panel of a broiling oven 2 defined by a top wall 3, side walls 4 and 5, rear wall 6, and a bottom wall (not shown). A plurality of rack support members 7, 8, 9 and 10 are located on side walls 4 and 5 and cooperate with a food broiling rack 11 so that the rack may be supported in a plurality of positions within oven 2. It will be understood that rack 11 functions to support a food container within the oven 2, such as a broiling pan 12.

Mounted adjacent top wall 3 and supported therefrom by means of brackets 13 and 14 is a broiling unit generally designated by the numeral 15 comprising a heating unit 16 which includes a plurality of parallel elongated heater sections 17. While for purposes of illustration there is shown in the drawing a tubular sheath heating unit, it will be understood that heating unit 16 may be of the open coil type. Heating unit 16 is supported by brackets 18 and 19 secured to the front edge of a frame 20 and by similar brackets secured to the rear of the frame.

Each of the parallel elongated heater sections 17 is provided with an elongated reflector 21 pivotally mounted on the heater section, by means of a pivot member 22, for movement about the axis of heater section 17. It will be understood that reflectors 21 need not be mounted directly on the heater sections 17 associated therewith, but that it is necessary that they be mounted for movement about an axis parallel to the major axis of the associated heater section. Each reflector 21 is provided with a bracket 23 to which are connected links 24, 25 and 26 whereby all of the reflectors 21 may be moved simultaneously while being retained in predetermined relationships to each other.

Figure 3:
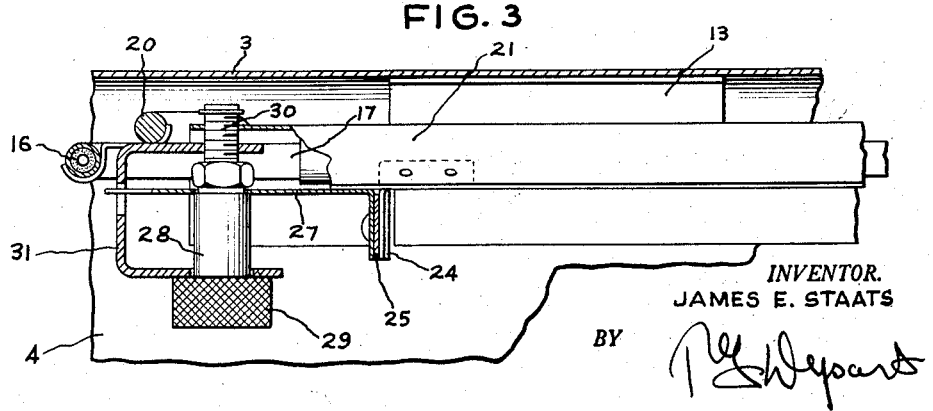
Fig. 3 is a fragmentary sectional view taken along the line 3—3 in Fig. 1.

As best shown in Fig. 3, a bracket 27 is rigidly secured to link 25 and carries an adjusting member 28 provided with a knurled control knob 29. Control member 28 includes a threaded end portion 30 threaded in an opening in a bracket 31 secured to frame 20, so that rotary movement of knurled knob 29 causes link 25 to move either up or down depending on the direction of rotation. This movement of link 25 causes pivotal movement of the two reflectors 21 directly connected thereto, and also, by means of links 24 and 26, pivotal movement of outermost reflector 21. It will be noted that the outermost reflectors are inclined inwardly at a greater angle than the two centrally located reflectors so that the heat radiated from heating unit 16 is always directed somewhat inwardly from side walls 4 and 5 so as to minimize loss of radiant heat to the walls of the broiling compartment. As shown in Fig. 3, the free end of bracket 27 projects through a slot in bracket 31 so as to provide an indication of the position of the reflectors.

Briefly reviewing the operation of the present invention, it will be evident that rotary movement of control knob 29 causes reflectors 21 to pivot about their respective axes so as to concentrate the heat radiated from heater sections 17 at any one of a plurality of distances from heating unit 15. Thus with rack 11 in the position shown in Fig. 1 the reflectors are positioned so as to concentrate the heat inwardly and downwardly so as to maintain a high heat intensity on broiling pan 12. However, it is sometimes desirable to broil foods at greater distances from heating unit 16, in which case rack 11 may be lowered and supported in other more remote positions by means of racks supports such as supports 8 and 10. Under these circumstances control knob 29 may be rotate so as to shift reflectors 21 to positions in which the radiated heat extends over a wider area and thus is concentrated at a location more remote from the location in which it is concentrated as shown in Fig. 1. It will of course be understood that the intensity of the heat received by broiling pan 12 in the position shown in Fig. 1 is greater than the intensity of heat received when pan 12 is supported at a lower position in the broiling compartment.

While I have shown and described a particular embodiment of my invention, I do not desire the invention to be limited to the particular construction disclosed, and I intend by the appended claim to cover all modifications within the true spirit and scope of the invention.

What I claim is:

A broiling oven comprising a compartment including top, bottom and side walls, an electric heating unit adjacent said top wall, said heating unit including a plurality of parallel elongated heater sections and a plurality of elongated reflectors each pivotally mounted adjacent one of said heater sections for movement about an axis parallel to the major axis of the heater section associated therewith, a plurality of rack support members located on said side walls, a food broiling rack within said compartment, said rack support members being constructed and arranged to support said rack at a plurality of distances from said heating unit, a plurality of link members interconnecting said reflectors for coordinated movement, and manually adjustable means associated with one of said links for positioning said reflectors so as to concentrate the heat radiated from said heater sections on food supported on said broiling rack, said manually adjustable means including a rotary control knob in operative engagement with one of said link members.

(References on following page)

References Cited in the file of this patent

UNITED STATES PATENTS

| | | |
|---|---|---|
| 1,102,540 | Onions | July 7, 1914 |
| 1,182,434 | Truitt | May 9, 1916 |
| 1,667,988 | Richardson | May 1, 1928 |
| 2,025,898 | Rhodes | Dec. 31, 1935 |
| 2,174,079 | Dadson | Sept. 26, 1939 |
| 2,413,447 | Greene | Dec. 31, 1946 |
| 2,470,645 | Reichart | May 17, 1949 |
| 2,478,253 | Doner | Aug. 9, 1949 |
| 2,610,280 | Wilson | Sept. 9, 1952 |
| 2,656,449 | Elgar | Oct. 20, 1953 |

FOREIGN PATENTS

| | | |
|---|---|---|
| 265,848 | Italy | July 9, 1929 |